(12) United States Patent
Kitchel et al.

(10) Patent No.: US 9,709,408 B2
(45) Date of Patent: Jul. 18, 2017

(54) SEGMENT VALIDATION

(71) Applicant: Strava, Inc., San Francisco, CA (US)

(72) Inventors: Davis Kitchel, Norwich, VT (US);
Brian Riordan, Norwich, VT (US)

(73) Assignee: Strava, Inc., San Francisco, CA (US)

( * ) Notice: Subject to any disclaimer, the term of this patent is extended or adjusted under 35 U.S.C. 154(b) by 0 days.

(21) Appl. No.: 14/629,425

(22) Filed: Feb. 23, 2015

(65) Prior Publication Data
US 2015/0211869 A1 Jul. 30, 2015

Related U.S. Application Data

(63) Continuation of application No. 13/788,392, filed on Mar. 7, 2013, now Pat. No. 8,996,301.

(60) Provisional application No. 61/609,847, filed on Mar. 12, 2012.

(51) Int. Cl.
G01C 21/32 (2006.01)
G01C 21/00 (2006.01)
G06F 17/30 (2006.01)
G01C 21/20 (2006.01)
G01S 19/19 (2010.01)
G01S 19/39 (2010.01)
G01S 19/40 (2010.01)

(52) U.S. Cl.
CPC ............ *G01C 21/32* (2013.01); *G01C 21/00* (2013.01); *G01C 21/20* (2013.01); *G01S 19/19* (2013.01); *G01S 19/39* (2013.01); *G01S 19/40* (2013.01); *G06F 17/30348* (2013.01); *G06F 17/30371* (2013.01)

(58) Field of Classification Search
CPC ........ G01C 21/28; G01C 21/30; G01C 21/32; G01S 19/19
See application file for complete search history.

(56) References Cited

U.S. PATENT DOCUMENTS

| | | | |
|---|---|---|---|
| 6,853,917 B2 | 2/2005 | Miwa | |
| 7,454,002 B1 | 11/2008 | Gardner et al. | |
| 7,828,697 B1 | 11/2010 | Oberrieder et al. | |
| 8,121,785 B2 | 2/2012 | Swisher et al. | |
| 2005/0049765 A1 | 3/2005 | Chetia et al. | |
| 2005/0250458 A1 | 11/2005 | Graham et al. | |
| 2007/0271036 A1 | 11/2007 | Atarashi | |
| 2008/0033633 A1 | 2/2008 | Akiyoshi et al. | |
| 2008/0167813 A1 | 7/2008 | Geelen et al. | |
| 2010/0062905 A1 | 3/2010 | Rottler et al. | |
| 2010/0063904 A1 | 3/2010 | Ronen et al. | |
| 2010/0088023 A1* | 4/2010 | Werner .............. | A63B 24/0021 701/467 |

(Continued)

FOREIGN PATENT DOCUMENTS

WO 2008105651 9/2008

OTHER PUBLICATIONS

Huang et al., "Accurate anchoring alignment of divergent sequences", Bioinformatics vol. 22 No. 1 2006, pp. 29-34.

(Continued)

*Primary Examiner* — Michael D Lang
(74) *Attorney, Agent, or Firm* — Van Pelt, Yi & James LLP

(57) ABSTRACT

Validating a segment is disclosed, including: determining that a stored segment meets a validation criterion; and adjusting GPS data associated with the stored segment using aggregated GPS data.

19 Claims, 13 Drawing Sheets

(56) References Cited

U.S. PATENT DOCUMENTS

| | | |
|---|---|---|
| 2010/0153348 A1 | 6/2010 | Perczynski et al. |
| 2011/0320156 A1 | 12/2011 | Oohashi et al. |
| 2012/0253488 A1 | 10/2012 | Shaw et al. |
| 2014/0058661 A1 | 2/2014 | Choi et al. |
| 2014/0350850 A1 | 11/2014 | Kmiecik et al. |

OTHER PUBLICATIONS

Collecting, Processing, and Integrating GPS Data into GIS, 2002, NCHRP.

* cited by examiner

SEGMENT VALIDATION

CROSS REFERENCE TO OTHER APPLICATIONS

This application is a continuation of co-pending U.S. patent application Ser. No. 13/788,392, entitled SEGMENT VALIDATION filed Mar. 7, 2013 which is incorporated herein by reference for all purposes, which claims priority to U.S. Provisional Patent Application No. 61/609,847 entitled TECHNIQUES TO IMPROVE ACCURACY OF GPS-BASED DATA filed Mar. 12, 2012 which is incorporated herein by reference for all purposes.

BACKGROUND OF THE INVENTION

Geographic data such as segments are used to represent real-world geographic tracks, paths, and/or routes. Sometimes, a segment may be derived from a recorded set of geographic positioning system (GPS) data associated with a user's physical activity (e.g., bike ride, run). However, because the GPS data associated with the user's physical activity could have been recorded with error, the segment derived from the associated GPS data could also include error. For example, the segment may not accurately reflect the real-world physical attributes of the intended geographical track, path, or route. Furthermore, even if a segment, in general, accurately reflects the real-world physical attributes of a trail at one point in time, the actual geography of the trail may change over time. As such, it would be desirable to update stored segments over time.

BRIEF DESCRIPTION OF THE DRAWINGS

Various embodiments of the invention are disclosed in the following detailed description and the accompanying drawings.

DETAILED DESCRIPTION

Figure 1:
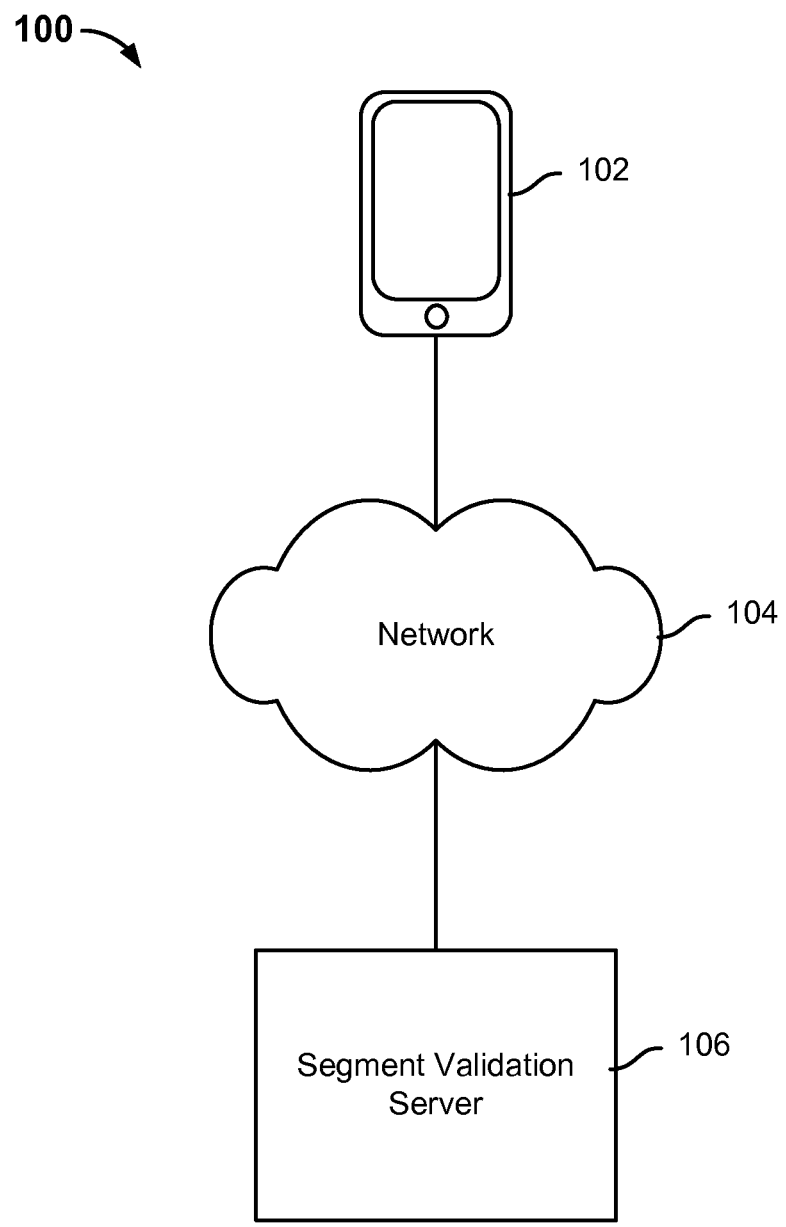
FIG. 1 is a diagram showing an embodiment of a system for validating segments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a segment refers to a representation of a real-world geographical track (e.g., route, path, trail) that is of interest and can be used as a reference (e.g., for comparison of athletic performances along that track and/or for other applications). For example, a segment can be used to identify a popular hill climb for cyclists, a running route, or a hiking trail. In various embodiments, a segment may be automatically defined. For example, third party sources that store information regarding common paths for various physical activities may be used to automatically define segments. In various embodiments, a segment may be defined by a user. For example, a user may make selections along a map at a user interface to draw out the segment. In another example of a user defined segment, a user may record an effort and define at least a portion of the GPS data associated with the effort as the segment. As used herein, an effort refers to a recorded series of GPS data with timestamps (e.g., which can represent an instance of a user's athletic performance or physical activity). In some embodiments, an effort is stored with auxiliary data (e.g., metrics of the activity with which the effort is associated). A segment may be stored so that, for example, it can be used as reference to which a recorded effort can be determined to match so that the effort can be, if desired, compared against one or more other recorded efforts that also match the same segment. In various embodiments, an effort is determined to match a segment by meeting matching criteria associated with the segment. In various embodiments, an effort that matches a segment is referred to as a "segment match" or a "matching effort to the segment." In some embodiments, data indicating a matching relationship is stored for each segment effort (i.e., matching effort) with respect to the segment that the effort has been determined to match.

However, a stored segment may need to be updated over time because it may have been defined with error. An example of a segment that may be defined with an error is a segment that is derived from the GPS data of a recorded effort. Specifically, recorded GPS data may include measures of latitude and longitude ("Lat-Lng Data") and time. Auxiliary data such as a user's heart rate, air temperature, elevation above sea level, power output, or another physiological, performance, or environmental parameter, for example, may be captured by the device at the same points in time as Lat-Lng Data. The GPS-enabled device that was used to record the effort may record GPS data with error, which is then passed to the segment that is defined from the effort. There are several kinds of errors that can corrupt the GPS data. For example, one type of error may be caused by the GPS-enabled device losing connection with one or more of the satellites that it needs to accurately track Lat-Lng Data. Another type of error may be caused by the device measuring data too infrequently to correctly pinpoint data being collected at all points and times. Yet another type of error may be caused by the device having a limited degree of accuracy such that it misinterprets Lat-Lng Data by introducing "drift" to the Lat-Lng Data. Furthermore, a stored segment may need to be updated over time because the geographic track that it is intended to represent may change over time. For example, the terrain of a trail that a segment was originally defined to represent may shift over time, which will cause the originally defined segment to become a less accurate representation.

Embodiments of validating segments are described herein. In various embodiments, validating a segment comprises adjusting at least some GPS data associated with (e.g., representing) the segment using aggregated GPS data. In various embodiments, the aggregated GPS data includes the GPS data of one or more efforts that were determined to match the segment. In some embodiments, validating the segment comprises generating a new version of the segment based on adjusting the GPS data associated with the stored segment using the aggregated GPS data. In some embodiments, the new version of the segment will replace the stored segment (the previous version of the segment) because it is assumed to be a more accurate representation of the geographic track that the stored segment was intended to represent. In some embodiments, the GPS data of one or more efforts determined to match the new version of the segment may be subsequently used to validate that segment. Subsequent validation of the segment may be iteratively performed.

FIG. 1 is a diagram showing an embodiment of a system for validating segments. In the example, system 100 includes device 102, network 104, and segment validation server 106. Network 104 includes high-speed data networks and/or telecommunications networks. Device 102 may communicate to segment validation server 106 over network 104. In some embodiments, system 100 may include more or fewer components than what is shown in the example of FIG. 1.

Device 102 is a device that can record GPS data and/or other data associated with a physical activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800), a mobile phone, such as a smart phone (e.g., an Android®-based device or Apple iPhone® device) including a GPS recording application (e.g., MotionX®, Endomondo®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an application thereof) is configured to record GPS data and auxiliary data associated with a physical activity during the activity. For example, auxiliary data associated with a physical activity may include physiological, environmental, and/or performance data. In some embodiments, device 102 is configured to receive recorded GPS data and auxiliary data associated with a physical activity subsequent to the completion of the activity (e.g., such information is uploaded to device 102).

In some embodiments, the recorded GPS data and the auxiliary data that represent an instance of a physical activity are referred to as an "effort." Put another way, an effort is an instance of a physical activity and can be represented through its geographical information as well as other metrics related to athletic performance. Examples of a physical activity include cycling, running, and skiing. In some embodiments, GPS data includes a series of consecutive and discrete GPS data points (e.g., latitude and longitude coordinates sometimes referred to as "Lat-Lng Data") with a timestamp for each point. In some embodiments, auxiliary data includes, but is not limited to, elevation, heart rate, power/watts (e.g., energy expended), time, speed (e.g., average and/or maximum speed per segment and/or route, in which average speed, for example, can be derived from time and GPS information), and/or cadence. Auxiliary data can be recorded at various granularities. For example, auxiliary data can correspond to each GPS data point, the entire activity (e.g., the auxiliary data includes averages of the metrics), or portions of the activity. As an example, one can use device 102 on a bike ride. At the end of the bike ride, the user can review his performance with the recorded GPS data (e.g., through a user interface of device 102) to observe the geographical track that he traversed, how much energy he expended along the ride, how fast he finished it in, average speed, elevation-based metrics, and/or other metrics. In some embodiments, device 102 is configured to store the recorded GPS data and the auxiliary data (e.g., effort) and/or send the effort information to server 106. In some embodiments, device 102 is configured to present an interactive user interface. The user interface may display GPS data and receive selections (e.g., made by a user) with respect to the displays. In some embodiments, device 102 sends the selections that it receives to segment validation server 106.

In some embodiments, a user interface may be presented at device 102. In some embodiments, the user interface may be presented by segment validation server 106 or by another component that is not shown in the example of FIG. 1. The user interface is configured to receive a user definition of a segment. In some embodiments, the user interface is configured to display a visual representation of the GPS data of a recorded effort at the user interface using a map software application. The visual representation can be, for example, a series of flags or a continuous line marked on a graphical map. In some embodiments, segment validation server 106 is able to support a map at the user interface by including logic configured to interact with the Application Programming Interface (API) of a map software/application (e.g., Google® Maps, MapQuest®, Bing® maps, and/or another mapping application/service). In some embodiments, a user may define a segment using the visual representation of the GPS information. In some embodiments, a start point and a finish (e.g., end) point along the visual representation of the GPS information are selected on the graphical map to define a segment. For example, a user may select (e.g., by dropping a marker or clicking) the start and/or finish points along the geographical track that he or she just traversed during a physical activity. The portion of the geographical track between the selected start and finish points is thus defined as a segment. In some embodiments, the start and finish points are stored with the defined segment. In some embodiments, the portion of the geographical track between the selected start and finish points is converted into an abstracted form and then stored in a database for storing segments. In some embodiments, the associated data that corresponds to the defined segment is also stored with the segment at the database.

In some embodiments, the user interface is configured to receive a user definition of a segment using selections on a map without a visual representation of a recorded effort. In some embodiments, a graphical map (e.g., Google® Maps, MapQuest®) is presented and a series of selections of points on the map to indicate the course of a segment is received. This series of selections of points on the map need not be based on a recorded effort and can merely be any geographical track that is of interest. For example, the selected segment can be a track that a cyclist has rode over before but has not documented the ride or the selected segment can be a track that the cyclist would like to ride on in the future. The series of selections of points on the map can be converted into a series of GPS data (e.g., Lat-Lng Data). In some embodiments, the series of GPS data is converted into an abstracted form and then stored as a segment.

In some embodiments, subsequent to a definition of a segment at the user interface, stored efforts (e.g., sets of GPS data from past physical activities) are compared to the defined segment. In some embodiments, when an effort is compared against this defined segment, it is determined whether the effort matches the segment in part by checking whether the GPS data of the effort indicates that the start point and/or finish point of the segment have been crossed. In some embodiments, identifiers associated with matching efforts are stored for each segment.

Segment validation server 106 is configured to validate a stored segment. In various embodiments, segment validation server 106 is configured to validate a stored segment based on aggregated GPS data associated with the segment. In some embodiments, aggregated GPS data associated with the segment includes at least some of the efforts that have been determined to match the segment. In some embodiments, segment validation server 106 is configured to start validation of a stored segment in response to a trigger to start the validation process. In response to the trigger, in some embodiments, segment validation server 106 is configured to use at least some of the GPS data associated with one or more efforts that have been determined to match the segment to adjust the GPS data associated with the segment. In some embodiments, adjusting the GPS data associated with the segment includes generating a new version of the segment. In some embodiments, the new version of the segment may comprise a modified version of the set of GPS data associated with the previous version of the segment. In some embodiments, the new version of the segment may also be referred to as the "validated segment." In some embodiments, the validated segment will replace the previous version of the segment. In some embodiments, stored efforts, if any, that match the validated segment are determined. In some embodiments, segment validation server 106 is configured to validate the validated segment based on aggregated GPS data (e.g., GPS data that matches the validated segment). In this manner, segment validation server 106 is configured to iteratively, over time, validate a segment using aggregated GPS data associated with the segment (e.g., GPS data associated with efforts that match the segment).

Validating a segment leverages a body of relevant user submitted GPS data to generate a more accurate and/or more current representation of the intended geographic track. In some embodiments, only a portion of the relevant user submitted GPS data recorded by one or more GPS devices that are known to be more accurate may be selected to validate the segment, to increase the accuracy of the validation process. More accurate segments can provide better matches to recorded efforts and therefore increase the probability that an effort recorded along a certain geographic track will be determined to match the segment defined to represent that geographic track.

Figure 2:
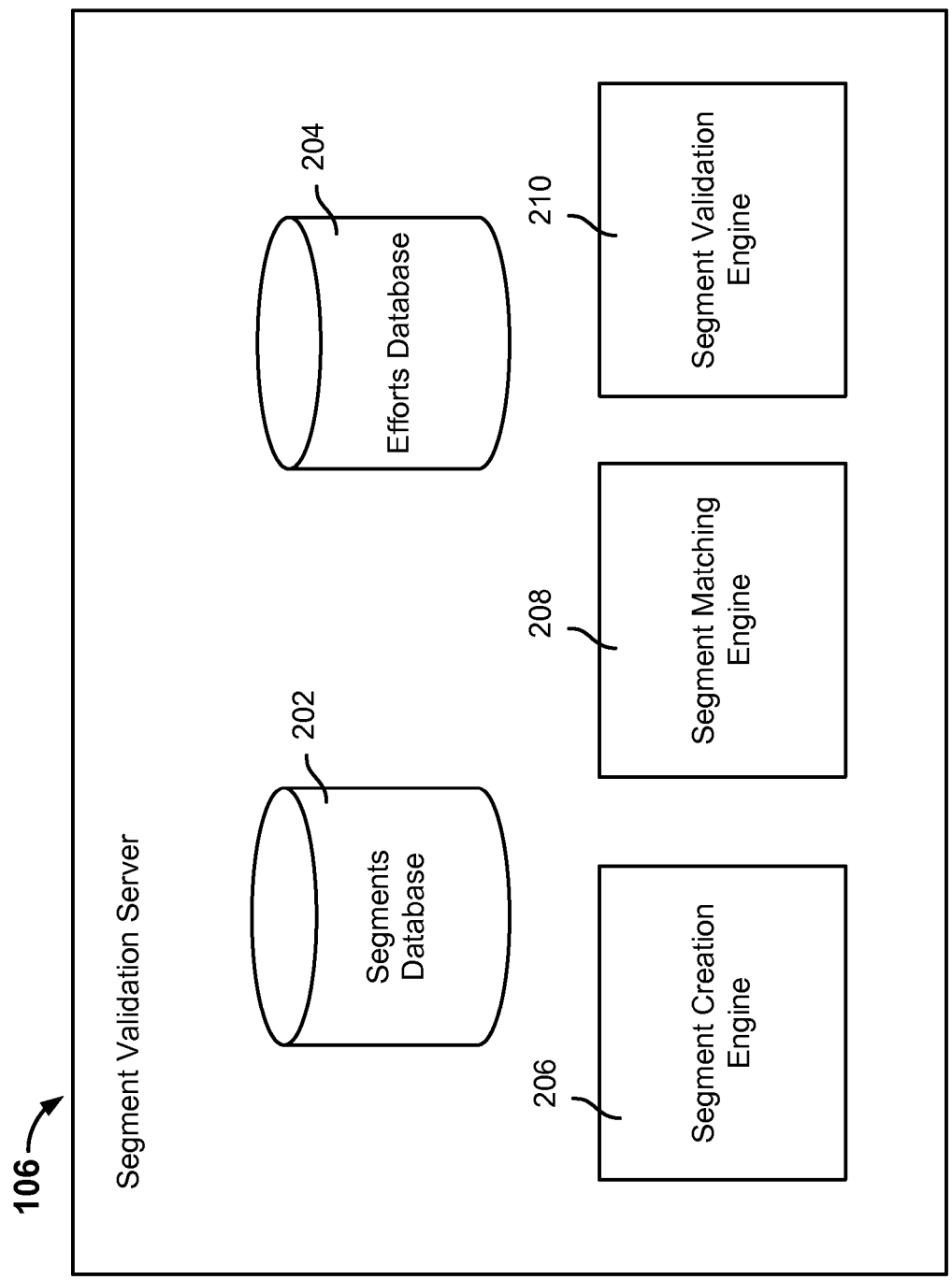
FIG. 2 is a diagram showing an embodiment of a segment validation server.

FIG. 2 is a diagram showing an embodiment of a segment validation server. In some embodiments, segment validation server 106 of system 100 of FIG. 1 may be implemented using the example of FIG. 2. In some embodiments, a segment validation server may include more or fewer components than what is shown in the example of FIG. 2. The example of the segment validation server includes segments database 202, efforts database 204, segment creation engine 206, segment matching engine 208, and segment validation engine 210. Each of segments database 202 and efforts database 204 may be implemented using one or more databases. Each of segment creation engine 206, segment matching engine 208, and segment validation engine 210 may be implemented using one or both of hardware and software.

Segments database 202 is configured to store segments. In some embodiments, segments database 202 is configured to store segments derived from recorded user efforts. In some embodiments, segments database 202 is configured to store segments generated by user selections along a map application (independent of a recorded effort). In some embodiments, segments database 202 is configured to store segments generated based on third party sources. In some embodiments, a segment is stored as a set of GPS data. In some embodiments, the set of GPS data associated with a segment is converted into an abstracted form (e.g., minimum bounding rectangles) and the converted data is stored to represent the segment. In some embodiments, each segment is stored with a set of metadata. For example, the set of metadata associated with each segment may include an identifier associated with the segment, a number of times that a segment associated with the segment identifier has been validated/refined (e.g., a version number of the segment associated with the segment identifier), identifiers of stored efforts that have been determined to match the segment (e.g., within a recent period of time or since the last time the segment was validated), a time at which the segment associated with the identifier was originally created, and one or more types of physical activity that are associated with the segment (e.g., running and biking) In some embodiments, if a segment has been validated at least once previously, then at least one or more previous versions of the segment may be stored (but not used to match to efforts).

In some embodiments, each segment stored at segments database 202 is associated with one or more matching criteria. If an effort is determined (e.g., by segment matching engine 208) to meet the criteria associated with a segment, then the effort is determined to match the segment and data indicating the matching relationship between the segment and the effort may be stored with the segment and/or the effort. For example, matching criteria associated with a segment may include a threshold degree of similarity that an effort has to meet in order to match the segment. In some embodiments, each segment stored at segments database 202 is associated with the same set of matching criteria. In some embodiments, different segments stored at segments database 202 may be associated with different sets of matching criteria.

Segment creation engine 206 is configured to receive user definition of segments. In some embodiments, segment creation engine 206 is configured to present a user interface associated with segment definition. In some embodiments, a user may submit to segment creation engine 206 a set of GPS data associated with a recorded effort and segment creation engine 206 is configured to present a visual representation of the effort at the user interface. Then user selections associated with a start point and end point along the visual representation of the GPS data associated with the effort are received and segment creation engine 206 is configured to store at least the portion of the GPS data associated with the effort between the start point and the end point as a segment at segments database 202, for example. In some embodiments, segment creation engine 206 is configured to present a map application (e.g., associated with a third party service such as Google® maps) at the user interface and receive one or more user selections (e.g., user clicks along a path on the map) with respect to the map application. The one or more user selections on the map application are then converted into a set of (e.g., GPS) data and stored as a segment at segments database 202, for example. In some embodiments, segment creation engine 206 is configured to prompt the user (via the user interface) to input metadata associated with the segment. For example, the user may be prompted to input an identifier for the segment and one or more types of physical activity associated with the segment.

Efforts database 204 is configured to store user recorded and uploaded efforts. In some embodiments, an effort is recorded during a user's physical activity by a GPS-enabled device. Examples of a user's physical activity may include biking or running Examples of a GPS-enabled device may include a GPS-enabled smart phone with an application associated with recording GPS data installed or a GPS-enabled watch. For example, a user can wear a GPS-enabled device on his body as he performs a physical activity. The user can interact with the device to start and end recording. While the device is in the recording mode, it may record discrete data points, where each data point may be associated with a GPS coordinate (e.g., Lat-Lng coordinates), a time association, and one or more physical, physiological, environmental, and/or performance related metrics (e.g., heart rate, cadence, power, speed, acceleration). In some embodiments, a user interface may be provided for the user and the user may upload a recorded effort using at least the user interface. For example, the user can establish a wired or wireless connection between the GPS-enabled device and a computer to upload the data associated with the recorded effort(s), direct the web browser installed at the computer to a web address associated with the user interface, and upload the data associated with the recorded effort(s) to the segment validation server. Furthermore, the user interface may prompt the user to provide metadata to be associated with an uploaded effort such as, for example, an identifier, a type of physical activity associated with the effort, an identifier associated with the type of device the effort was recorded with, an identifier of a user associated with the effort, and additional notes. In some embodiments, the set of metadata associated with an effort may be updated over time. For example, over time, an effort may be determined to match different or additional segments.

In some embodiments, an effort stored at efforts database 204 is matched against one or more segments stored at segments database 202. For example, subsequent to a user uploading a recorded effort to the segment validation server, segment matching engine 208 is configured to compare the effort against each of the segments stored at segments database 202, for example, to determine whether the effort matches one or more segments. In some embodiments, an effort is determined to match a segment based on the set of GPS data associated with the effort meeting one or more matching criteria associated with the segment. In the event that an effort is determined to match a segment (e.g., stored at segments database 202), the effort is then stored with an identifier associated with the matching segment. As such, if efforts that match a certain segment are to be determined, then the efforts of efforts database 204 can be searched for those that are associated with the segment's identifier.

Segment matching engine 208 is configured to match efforts to stored segments. In some embodiments, segment matching engine 208 is configured to determine whether at least some efforts stored at efforts database 204 match one or more segments stored at segments database 202. Segment matching engine 208 is configured to determine whether an effort meets the one or more matching criteria associated with a particular segment. In the event that segment matching engine 208 determines that an effort matches a segment, then data indicating the matching relationship between the segment and effort may be stored with the segment and/or the effort.

Segment validation engine 210 is configured to validate segments. A goal of segment validation is to continuously improve the quality of a segment and to change the segment, if appropriate, to better reflect the true (e.g., real-world) geographical track that the segment is supposed to represent. In some embodiments, segment validation engine 210 validates at least some of the segments stored at segments database 202. Segment validation engine 210 validates a segment based on aggregated GPS data. In some embodiments, segment validation engine 210 performs validation on a segment that meets one or more validation criteria. For example, a validation criterion is that a predetermined period of time has passed since the segment has been created or last validated. Another example of a validation criterion is that a predetermined number of efforts (e.g., recorded by a particular GPS-enabled device) has been determined to match the segment. Yet another example of a validation criterion is that less than a predetermined threshold of efforts has been determined to match the segment since the segment has been created or last validated.

Once segment validation engine 210 determines that a stored segment has met at least one validation criterion, segment validation engine 210 proceeds to validate the segment. In some embodiments, segment validation engine 210 is configured to validate a stored segment based on aggregated GPS data including at least the set of efforts that have been determined to match the segment. For example, segment validation engine 210 can query efforts database 204 for the efforts that have been determined to match the segment to be validated (e.g., based on metadata stored with the efforts). In some embodiments, segment validation engine 210 is configured to use at least the obtained efforts (e.g., the efforts' corresponding sets of GPS data) that have been determined to match the segment to validate the segment. In some embodiments, segment validation engine 210 is configured to generate a new version of the segment based on the obtained set of efforts. In some embodiments, segment validation engine 210 is configured to replace the previous version of the segment with the new version of the segment as a result of the validation. In some embodiments, the new version of the segment, which is sometimes referred to as the "validated segment," is stored with at least some of the metadata (e.g., segment identifier) associated with the previous version of the segment so as to replace the previous version. In some embodiments, the metadata associated with the new version of the segment may be updated to include an incremented version number. In some embodiments, segment validation engine 210 is configured to match one or more efforts (from efforts database 204) to the validated segment. As a result of the validation, more, fewer, or different efforts may be determined to match the segment. In various embodiments, segment validation engine 210 is configured to iteratively validate a segment based on aggregated GPS data. For example, the new version of the segment (the validated segment) may eventually meet a validation criterion and become validated by segment validation engine 210 based on the efforts that have been determined to match that version of the segment.

Because a segment may be originally derived from the GPS data associated with a recorded user effort, sometimes the error included in the recording of the effort may be passed onto the resulting segment. As a result, certain efforts that were recorded with greater accuracy along the geographic track that a segment was intended to represent may not be determined to match the segment, which will negatively affect users' ability to compare performances along the same geographic track. However, by continuously updating/validating an existing segment using at least aggregated user GPS data that is relevant to the segment (e.g., matching efforts), the segment may be continually improved to more accurately reflect the current real-world shape of the geographic track.

Figure 3:
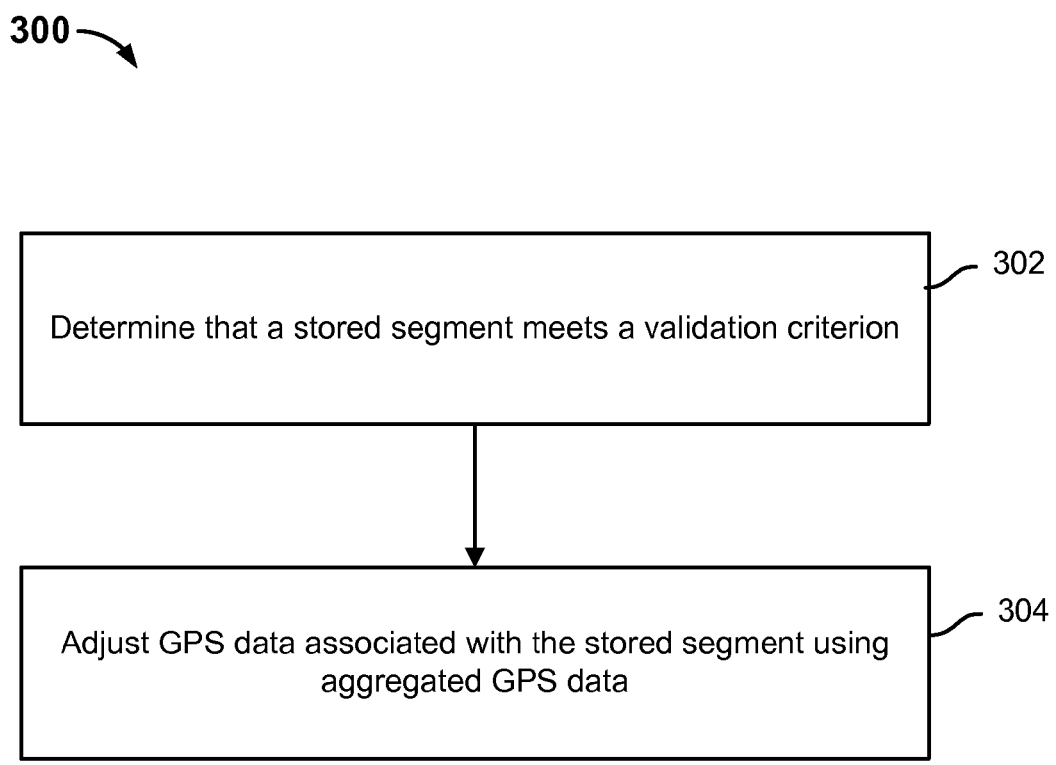
FIG. 3 is a flow diagram showing an embodiment of a process of validating a segment.

FIG. 3 is a flow diagram showing an embodiment of a process of validating a segment. In some embodiments, process 300 is implemented at system 100 of FIG. 1.

At 302, it is determined that a stored segment meets a validation criterion. In some embodiments, segment validation for a stored segment begins when the segment meets a validation criterion. In some embodiments, one or more validation criterion may be user configured. A first example of a validation criterion is an elapse of a predetermined time interval since the segment was last validated or since the segment's initial creation. A second example of a validation criterion is when less than a predetermined number of efforts are determined to match the segment within a predetermined period of time (e.g., the lack of matching efforts may indicate that the segment was created with significant error). A third example of a validation criterion is when the number of efforts that match the segment has reached a predetermined threshold. A fourth example of a validation criterion is when the number of efforts recorded by a selected device (e.g., that is known to be relatively more accurate than other devices) that match the segment has reached a predetermined threshold. A fifth example of a validation criterion is receipt of an indication of a user selection to initiate the validation process.

At 304, GPS data associated with the stored segment is adjusted using aggregated GPS data. In various embodiments, sets of GPS data associated with the segment are aggregated and used to adjust the GPS data associated with the segment. In some embodiments, sets of GPS data associated with the segment comprise the GPS data associated with the efforts that have been determined to match the segment. In some embodiments, the sets of GPS data corresponding to the matching efforts are obtained and used to generate a new version of the segment. In some embodiments, the new version of the segment is used to replace the previous version of the segment.

Figure 4:
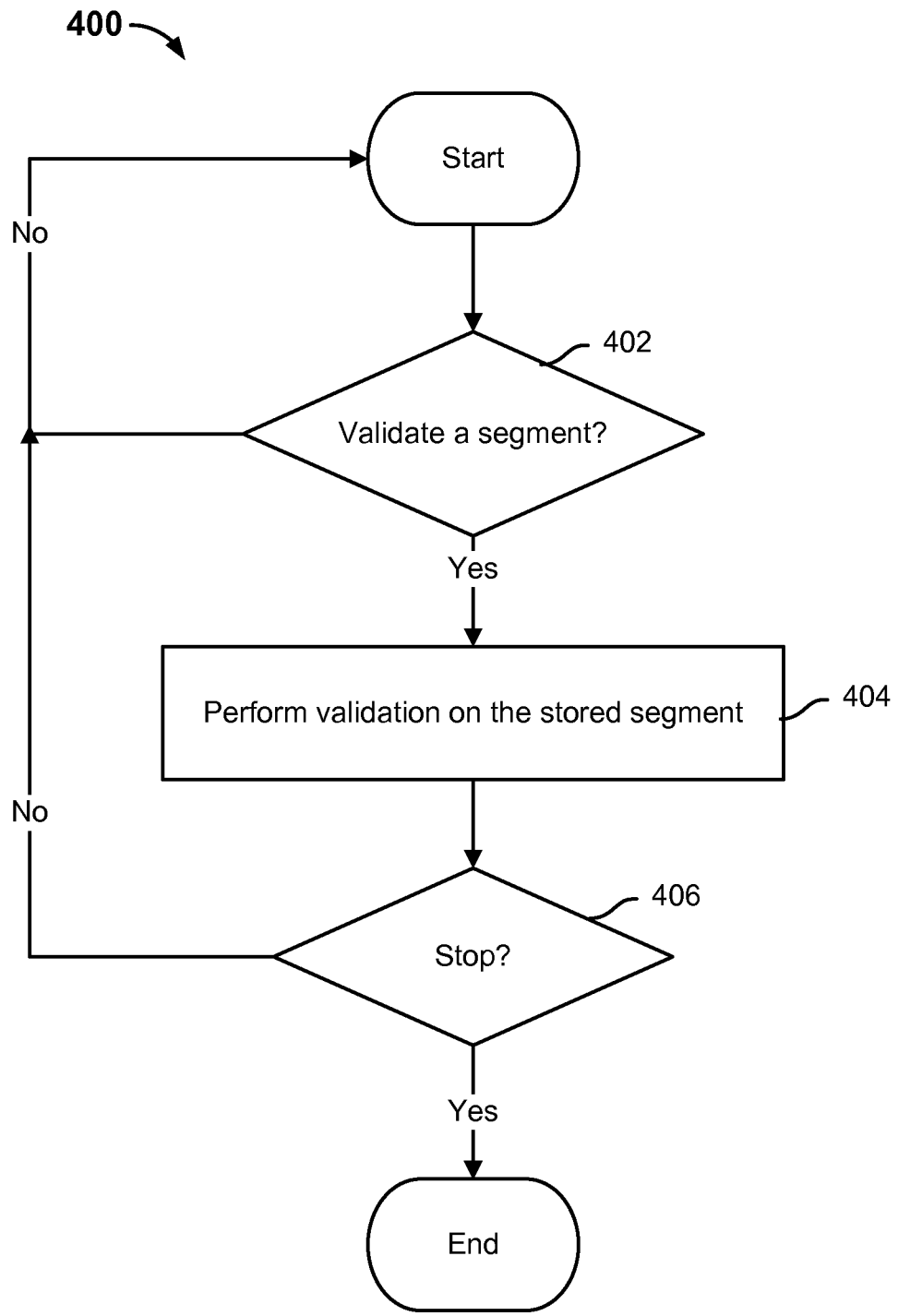
FIG. 4 is a flow diagram showing an embodiment of a process for performing segment validation.

FIG. 4 is a flow diagram showing an embodiment of a process for performing segment validation. In some embodiments, process 400 is performed at system 100 of FIG. 1.

Process 400 shows that a segment may be repeatedly validated to further improve the accuracy and quality of the segment. In some embodiments, process 400 is performed for each stored segment.

At 402, it is determined whether a segment is to be validated. In some embodiments, the segment is determined to be validated based on the segment meeting at least one validation criterion. Examples of validation criterion include an elapse of a predetermined time interval since a previous validation or creation of the segment, when the number of efforts determined to match the segment reaches a predetermined threshold number, when the number of matching efforts is less than a predetermined number during a predetermined period of time, and when an indication associated with a user selection for the segment to be validated is received.

At 404, validation is performed on the stored segment. In some embodiments, aggregated GPS data associated with the segment is used to perform validation of the segment. In some embodiments, as a result of the validation, a new version of the segment is generated and used to replace the previous version of the segment.

At 406, it is determined whether to stop validation of the segment. For example, the cycle of segment validation may be stopped in response to a user selection to stop the process or in response to the system losing power. In the event that validation is determined to be stopped, process 400 ends. Otherwise, in the event that validation is determined to continue, control passes to the start of 400. For example, after one iteration of step 404, the new version of the segment is determined to replace the previous version of the segment. Then when the next iteration process 400 is performed, this new version of the segment is determined to be validated.

Figure 5:
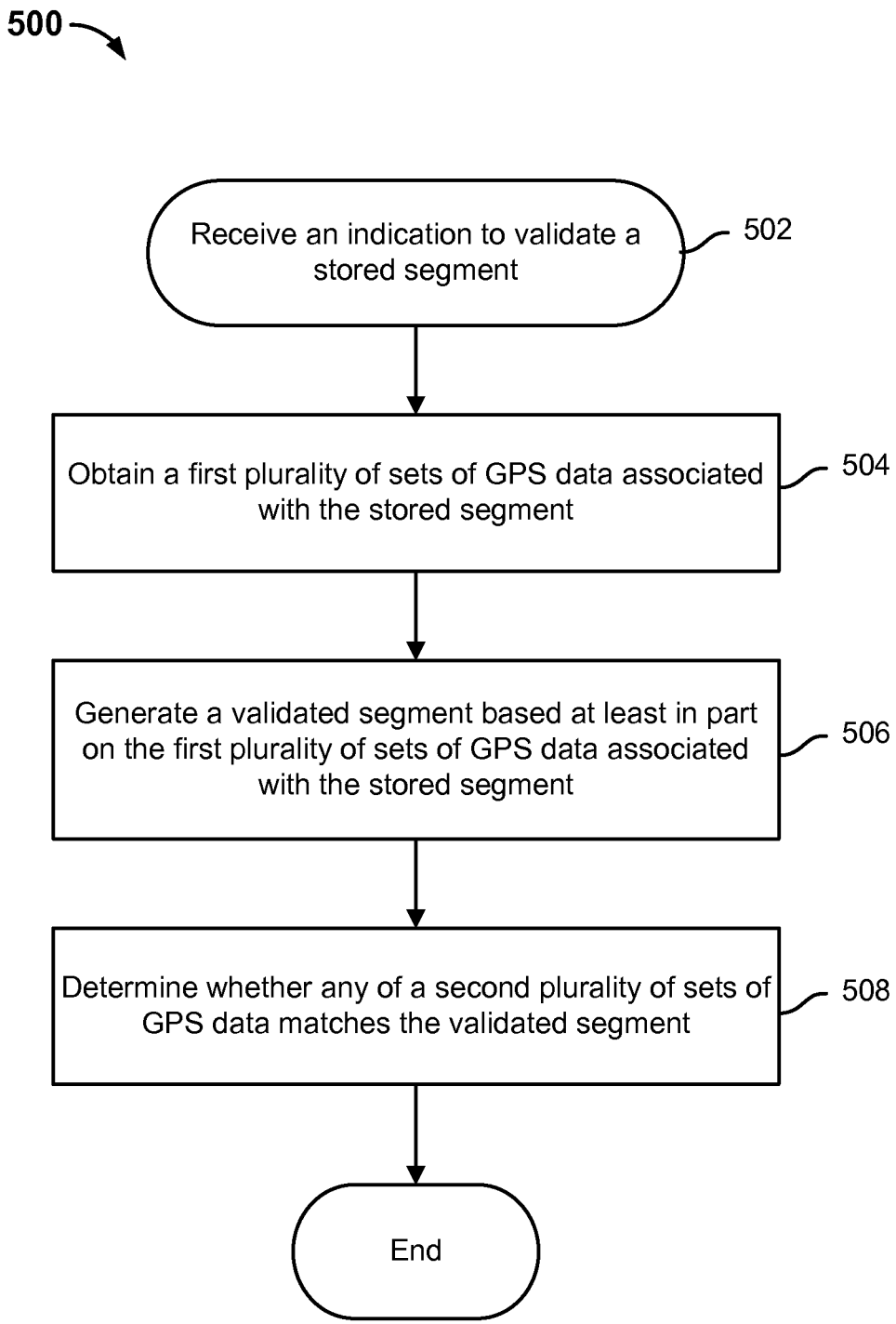
FIG. 5 is a flow diagram showing an embodiment of a process of validating a segment.

FIG. 5 is a flow diagram showing an embodiment of a process of validating a segment. In some embodiments, process 500 is performed at system 100 of FIG. 1. In some embodiments, step 404 of process 400 of FIG. 4 is performed using at least a portion of process 500.

Process 500 shows that efforts may be compared against a newly generated validated segment (i.e., a new version of a segment generated from validating a segment).

At 502, an indication to validate a stored segment is received. For example, the stored segment is determined to have met a validation criterion.

At 504, a first plurality of sets of GPS data associated with the stored segment is obtained. In some embodiments, the first plurality of sets of GPS data comprises the sets of GPS data corresponding to the efforts that have been determined to match the stored segment since the segment was initially created or was last validated.

At 506, a validated segment is generated based at least in part on the first plurality of sets of GPS data associated with the stored segment. In some embodiments, the validated segment comprises a new version of the segment generated based on the set of efforts that had been determined to match the segment. In some embodiments, the previous version of the segment, which is the version of the segment prior to the current validation process, is replaced by the new version of the segment. In some embodiments, replacing a segment with a new version of the segment includes discarding the segment and storing the new version of the segment with at least some of the metadata that was stored for the discarded version. In some embodiments, the metadata associated with the new version of the segment includes an incremented version number.

At 508, it is determined whether any of a second plurality of sets of GPS data matches the validated segment. In some embodiments, the set of stored efforts is compared against the new version of the segment to determine which efforts match this new version. Sometimes, the validated segment (the new version of the segment) may differ from the previous version of the segment enough such that efforts that did not previously match the previous version of the segment may match this new version and/or efforts that previously did match the previous version of the segment may not match the new version of the segment. In some embodiments, identifiers of efforts that are determined to match the new version of the segment are stored with the segment so that such efforts may be used, in the future, to validate the formerly new version of the segment.

Figure 6:
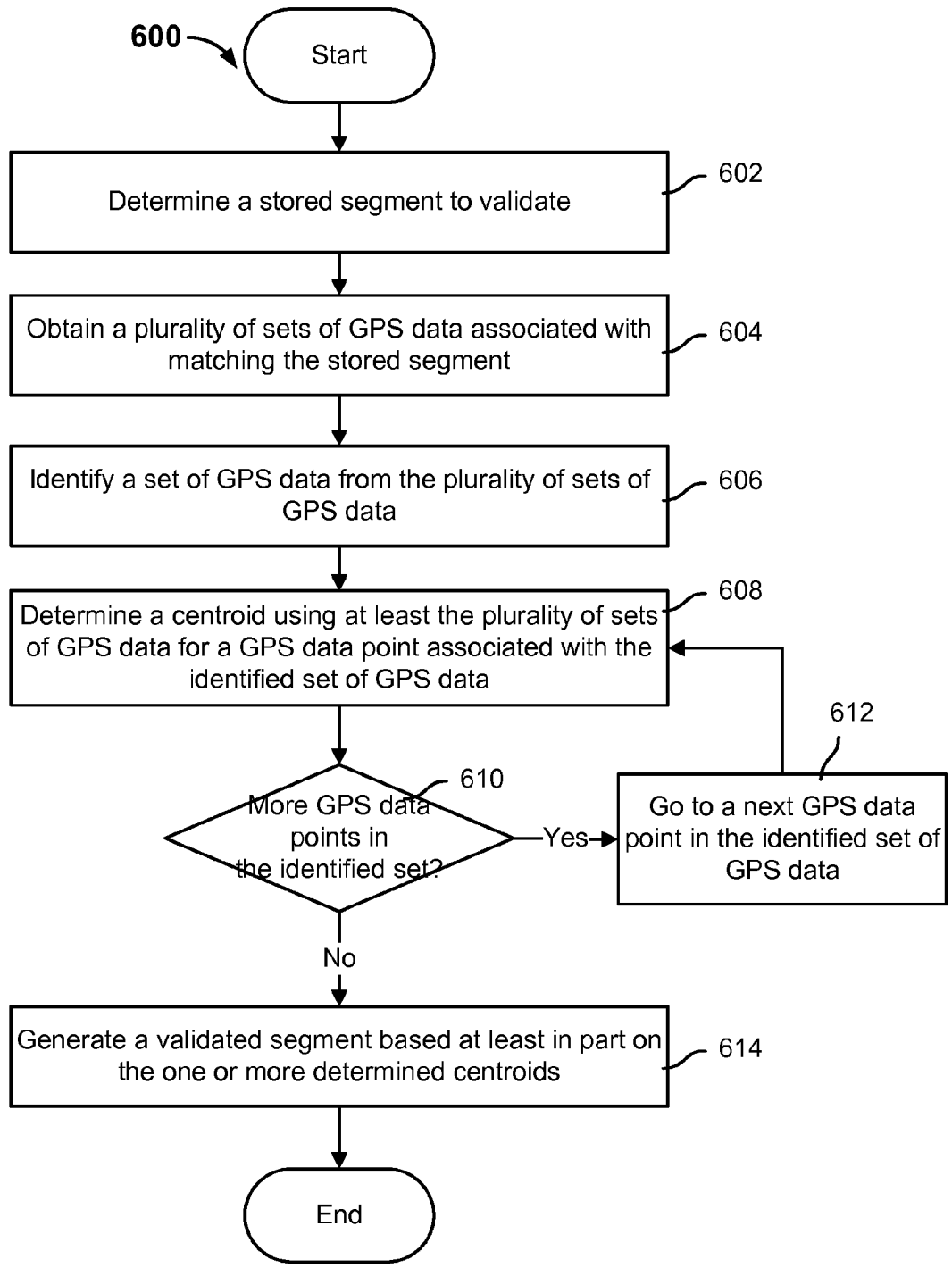
FIG. 6 is a flow diagram showing an example of determining a validated segment.

FIG. 6 is a flow diagram showing an example of determining a validated segment. In some embodiments, process 600 is performed at system 100 of FIG. 1. In some embodiments, steps 502, 504, and 506 of process 500 of FIG. 5 are performed using process 600.

At 602, a stored segment to validate is determined. For example, the stored segment is determined to have met a validation criterion.

At 604, a plurality of sets of GPS data associated with matching the stored segment is obtained. In some embodiments, the plurality of sets of GPS data associated with matching the stored segment is associated with the efforts that have been determined to match the stored segment.

At 606, a set of GPS data from the plurality of sets of GPS data is identified. In some embodiments, the set of GPS data associated with one of the matching efforts is identified based on one or more factors. Each found matching effort may be thought as a candidate effort and the identified effort may be referred to as the "best candidate effort." For example, tests may be applied to each of a subset of the candidate efforts that are recorded by a selected device (e.g., a device being selected for being known to record with relatively more accuracy) and the candidate effort associated with the highest score based on the given tests is identified. In some embodiments, the candidate effort identified as the "best candidate effort" is the effort that is determined to likely be the most accurate effort (e.g., the effort that was recorded with the most accuracy). In some embodiments, the best candidate effort is identified by "walking along" each candidate effort and measuring a count of found GPS data points associated with other candidate efforts within a given radius of each GPS data point along that candidate effort. Each GPS data point is of standard distance interval from the previous and the next GPS data point from start to end of the candidate effort. A sum is determined for each candidate effort based on adding together the count of found GPS data points within the given radius of each of the candidate effort's GPS data points. The candidate effort that has the highest sum is determined to be the best candidate effort because it is closest to a centroid of the group of candidate efforts and as will be described below, the validated segment is determined by finding centroids associated with the group of candidate efforts.

At 608, a centroid using at least the plurality of sets of GPS data for a GPS data point associated with the identified set of GPS data is determined. In some embodiments, each GPS data point of the best candidate effort is "walked along" to determine a centroid based on nearby GPS data points associated with at least some other candidate efforts. For example, for a given GPS data point of the best candidate effort (e.g., starting with the first recorded GPS data point), a radius of a certain distance is swept out around this GPS data point and at least some GPS data points associated with other candidate efforts within the swept out circle are used to determine a centroid. In some embodiments, only a subset of all candidate efforts is considered in validating the segment. In a specific example, only candidate efforts that were recorded by a selected device (e.g., a Garmin Edge® 800) are considered in validating the segment and so in determining a centroid for each GPS data point included in the best candidate effort, only GPS data points of efforts recorded by the selected device that are included in the radius of a certain distance from the GPS data point are used to find the centroid.

In some embodiment, the centroid technique also filters out GPS data points that are not going in the same general direction as the current best candidate effort GPS data point that is under consideration (i.e., GPS data points of candidate efforts that are not the best candidate efforts are not used to determine the centroid if they are not in the same general direction as the best candidate effort GPS data point). This way, when there is a tight hairpin turn such that GPS data points blend together from both sides of the hairpin, only the GPS data points going in the same general direction of the best candidate effort GPS data point are considered—therefore avoiding using GPS data points that are going in the wrong direction and making for a correct path around the turn. In some embodiments, the technique of finding a centroid is iterated through a predetermined number of times (e.g., four times) to determine the centroid. The rational for the multiple iterations is that a main corridor could be initially only touched by the area of the circle around the GPS data point of a best candidate effort—such that the centroid of those found GPS data points is still outside of the main corridor of GPS data points. It is found that multiple iterations enable the centroid to "march" to the corridor, and once there—it will stay there.

At 610, it is determined whether there are more GPS data points in the identified set. In the event that it is determined there are more GPS data points included in the best candidate effort, control passes to 612. Otherwise, control passes to 614.

At 612, the next GPS data point in the identified set of GPS data is considered and control returns to 608. The next GPS data point (e.g., the GPS data point recorded next in time) of the best candidate effort is considered until each GPS data point of the best candidate effort is walked along to create a new centroid based on step 608.

At 614, a validated segment is generated based at least in part on the one or more determined centroids. In some embodiments, the centroids created based on walking along each GPS data point of the best candidate effort are connected to form the new version of the segment that is to replace the previous version.

FIGS. 7 through 13 illustrate an example of performing process 600 of FIG. 6 to validate a segment.

Figure 7:
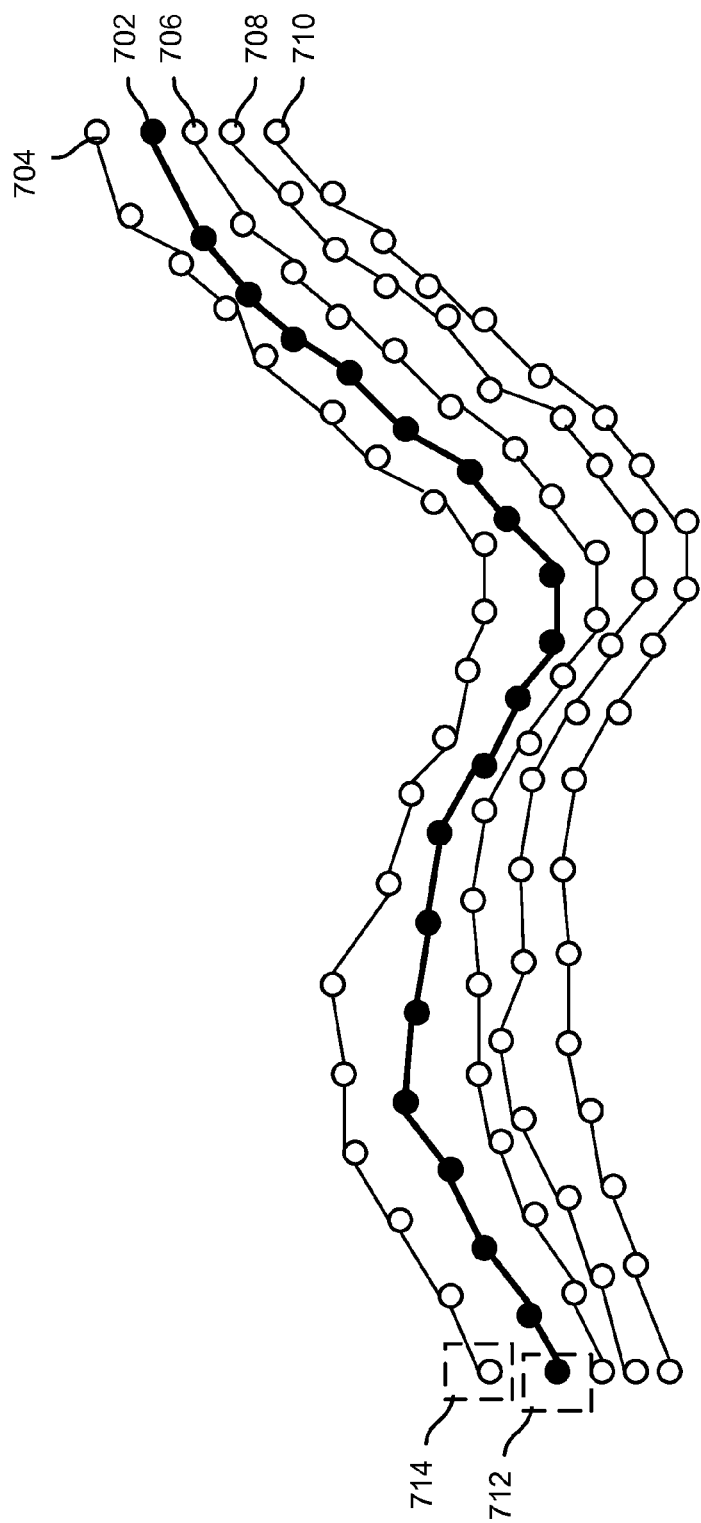
FIG. 7 is a diagram showing an example of visual representations of a segment and efforts that match the segment.

FIG. 7 is a diagram showing an example of visual representations of a segment and efforts that have been determined to match the segment. A segment may be represented by a series of discrete GPS data points. For example, GPS data point 712 is associated with segment 702. For example, segment 702 may have been defined based on the GPS data associated with a particular user's uploaded effort. The user may have recorded an effort and indicated (e.g., via a user interface) a portion of the GPS data associated with the effort to store as segment 702. Each effort also corresponds to a series of discrete GPS data points. For example, GPS data point 714 is associated with effort 704. As shown in the example, the GPS data points of segment 702 are plotted in a two-dimensional space (associated with latitudinal and longitudinal coordinates). The GPS data points of four user uploaded efforts (effort 704, effort 706, effort 708, and effort 710) that have been determined to match segment 702 are also plotted in the same space. If it is assumed that it is determined that a validation process is to begin on segment 702 (e.g., because segment 702 has met a validation criterion), then at least some of the efforts that have been determined to match segment 702 are used to validate segment 702. In the example, all four matching efforts, effort 704, effort 706, effort 708, and effort 710, are used to validate segment 702. Each of effort 704, effort 706, effort 708, and effort 710 may be recorded by the same or different GPS-enabled devices. In some embodiments, only matching efforts that are recorded by a selected type of GPS-enabled device are used to validate the segment (e.g., because the selected type of GPS-enabled device is determined to be relatively more accurate).

For example, segment 702 may have been defined based on user Steve's uploaded effort associated with a bike ride. Steve may have recorded the bike ride and indicated (e.g., via a user interface) a portion of the geography covered by the bike ride to store as segment 702. For example, Steve may input the identifier of "Montalvo hill climb" for segment 702 to denote the name of the popular climb that he biked over and the geographical track that segment 702 is intended to represent. Over time, other users have recorded various efforts that have been determined to match segment 702 and such efforts include at least effort 704, effort 706, effort 708, and effort 710.

Figure 8:
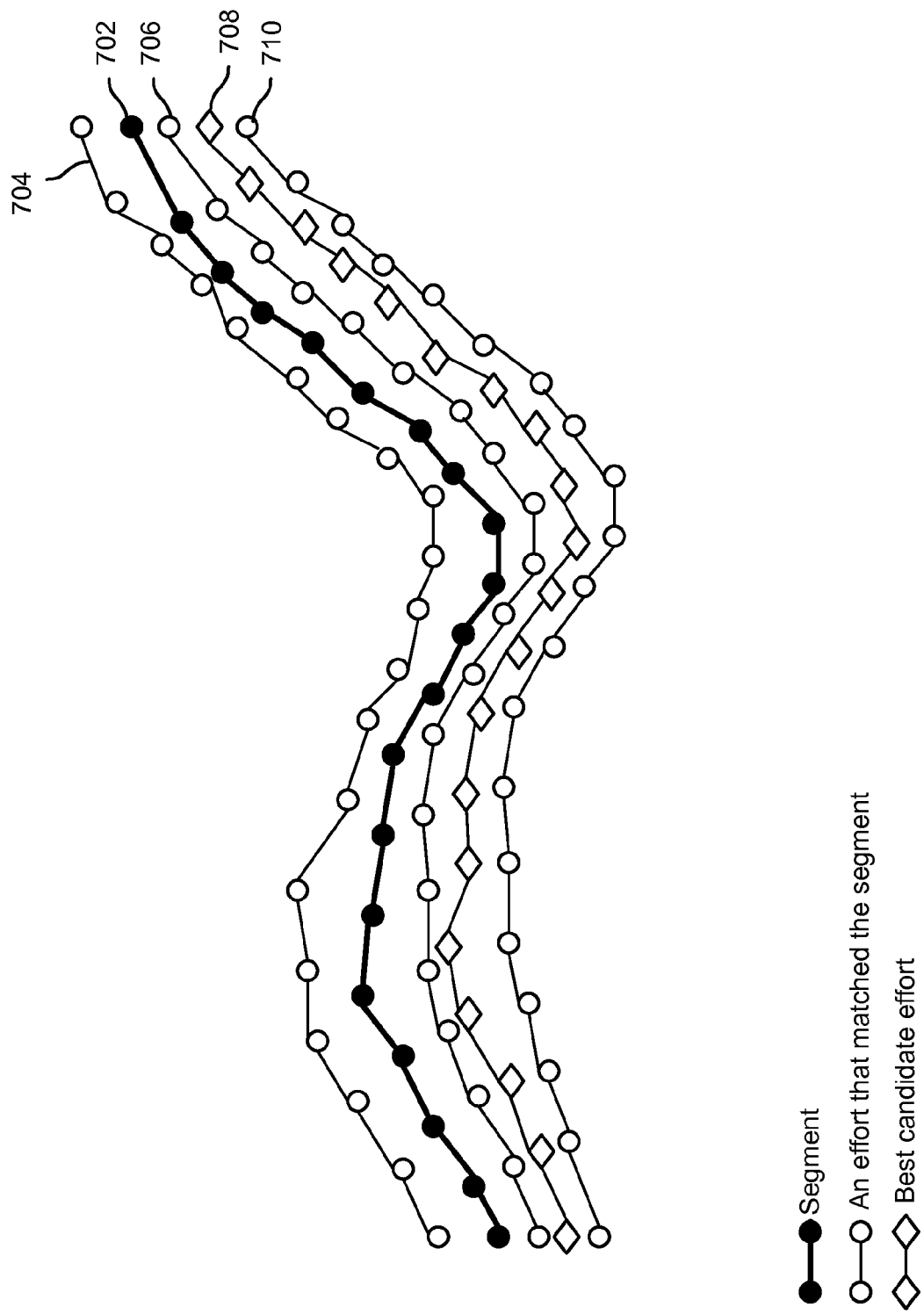
FIG. 8 is a diagram showing an example of selecting a best candidate effort.

FIG. 8 is a diagram showing an example of selecting a best candidate effort. Continuing the example of FIG. 7, in FIG. 8, one of the matching efforts (candidate efforts) is identified as the best candidate effort. For example, an effort may be identified as the best candidate effort as a result of determining that the effort is associated with the highest sum of the counts of GPS data points in the vicinity of each of its GPS data points. The best candidate effort is to serve as a reference effort to use in determining the validated segment (i.e., the new version of segment 702). In the example, effort 708 is determined to be the best candidate effort.

Figure 9:
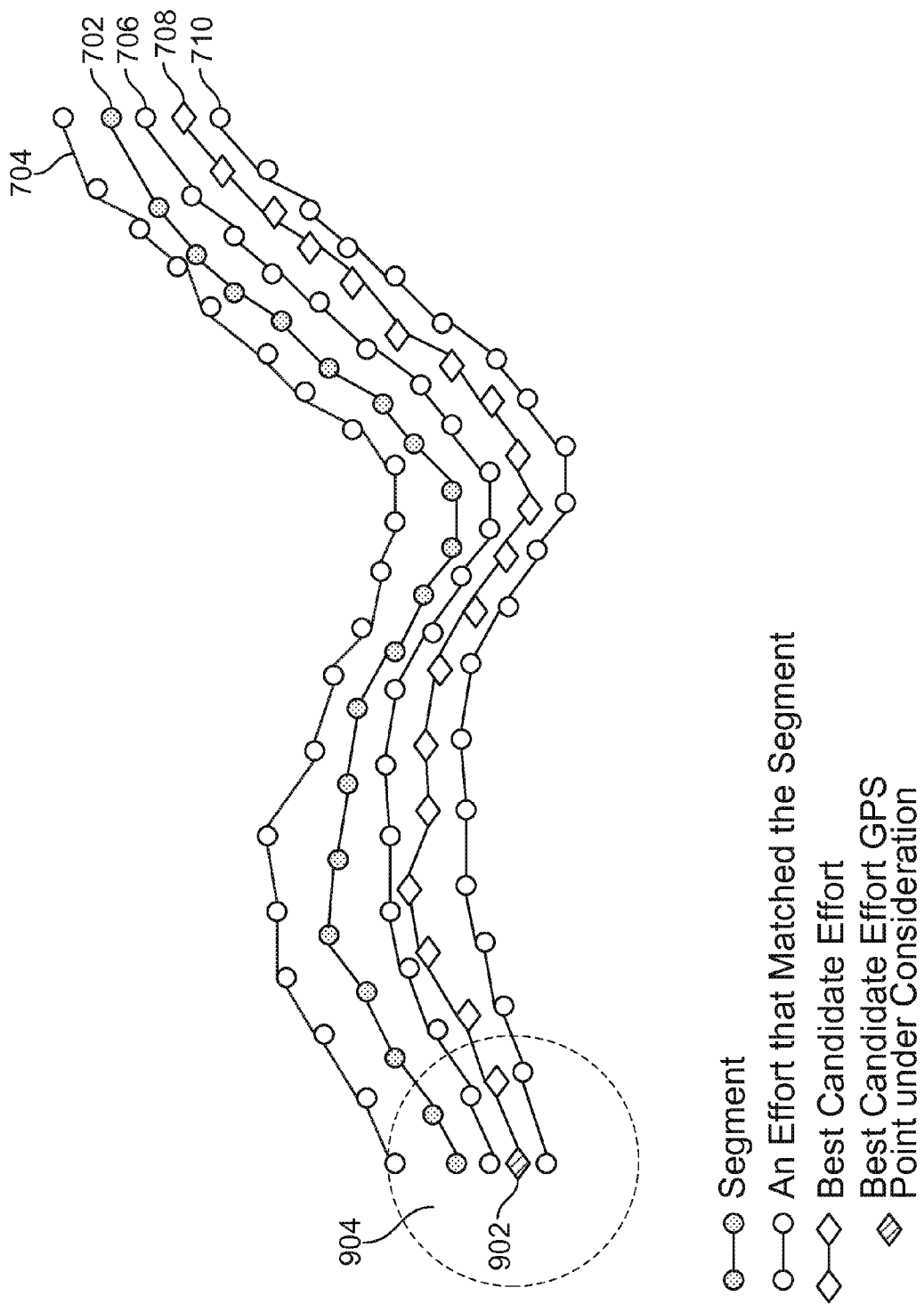
FIG. 9 is a diagram showing the determination of a centroid based on a GPS data point of the best candidate effort.

FIG. 9 is a diagram showing the determination of a centroid based on a GPS data point of the best candidate effort. As described above, each GPS data point of the best candidate effort may be used to form the center of a circular area (e.g., of a predetermined radius) for which at least a subset of GPS data points associated with the other considered matching efforts (and in some embodiments, the original segment, segment 702) enclosed in the circular area is used to determine a centroid. The centroid is associated with its own set of Lat-Lng coordinates. In some embodiments, a centroid determination function may be applied a predetermined number of times (e.g., four) on the GPS data points included in the circular area centered on the current GPS data point of the best candidate effort for such GPS data points to converge into a centroid. In the example, GPS data point 902 of the best candidate effort, effort 708, is the current GPS data point around which the circular area 904 is drawn. The GPS data points of the other efforts (effort 704, effort 706, and effort 710) that are included in circular area 904 are used to compute a centroid.

Figure 10:
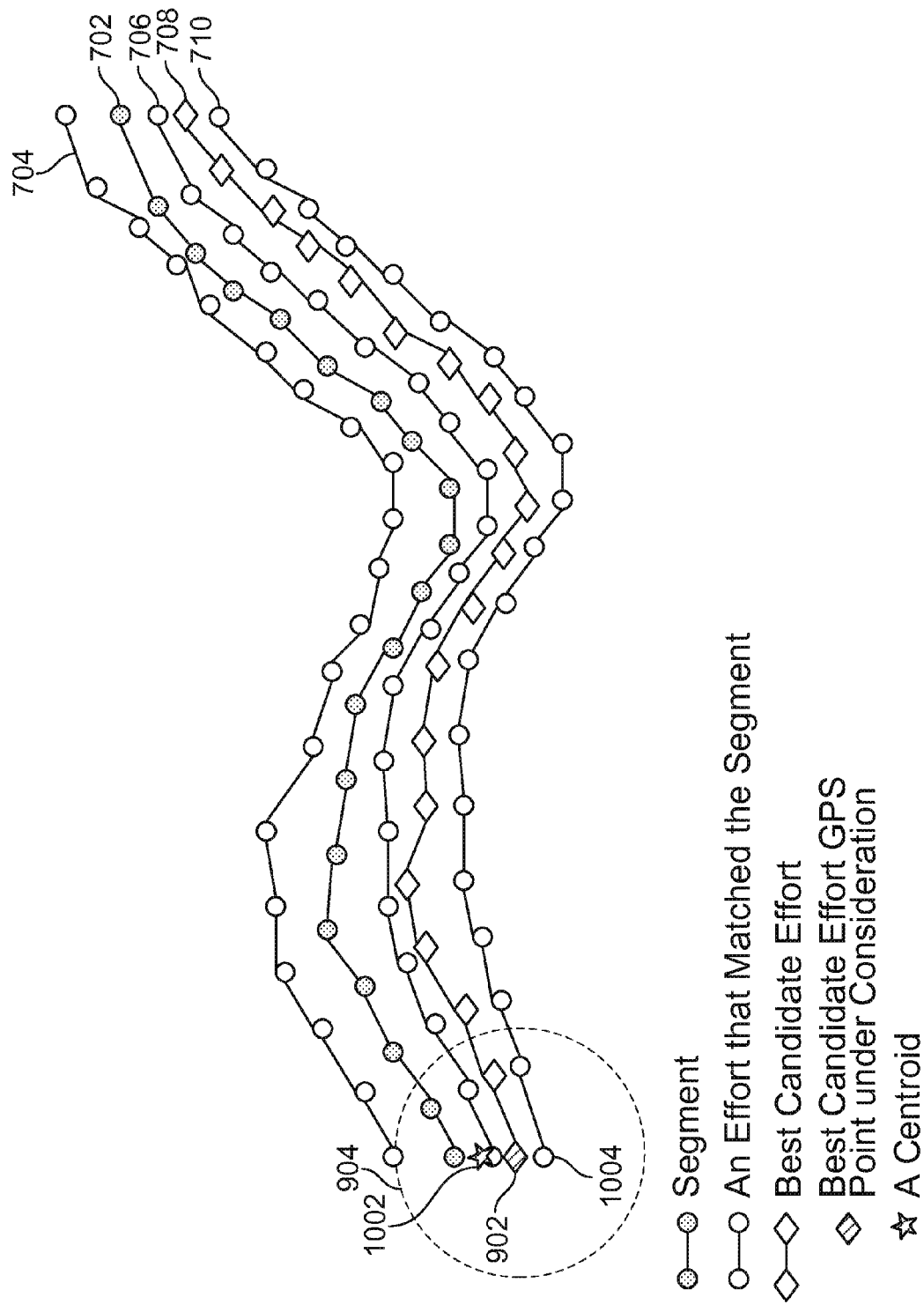
FIG. 10 is a diagram showing a centroid determined based on a GPS data point of the best candidate effort.

FIG. 10 is a diagram showing a centroid determined based on a GPS data point of the best candidate effort. Continuing the example of FIG. 9, in FIG. 10, centroid 1002 is computed based on at least a subset of the GPS data points of the other efforts (effort 704, effort 706, and effort 710) that are included in circular area 904. Each subsequent GPS data point of the best candidate effort can be similarly used to determine a corresponding centroid.

In some embodiments, in determining the centroid associated with the first GPS data point of the best candidate effort, such as GPS data point 902 of the best candidate effort in the example, only the first data point of each of the other candidate efforts (e.g., such as GPS data point 1004 of effort 710) are considered so that the centroid will fall along the same start plane as the original segment, segment 702. Making sure that the centroid falls along the same start and end planes as the segment before the validation will help preserve the length of the segment.

Figure 11:
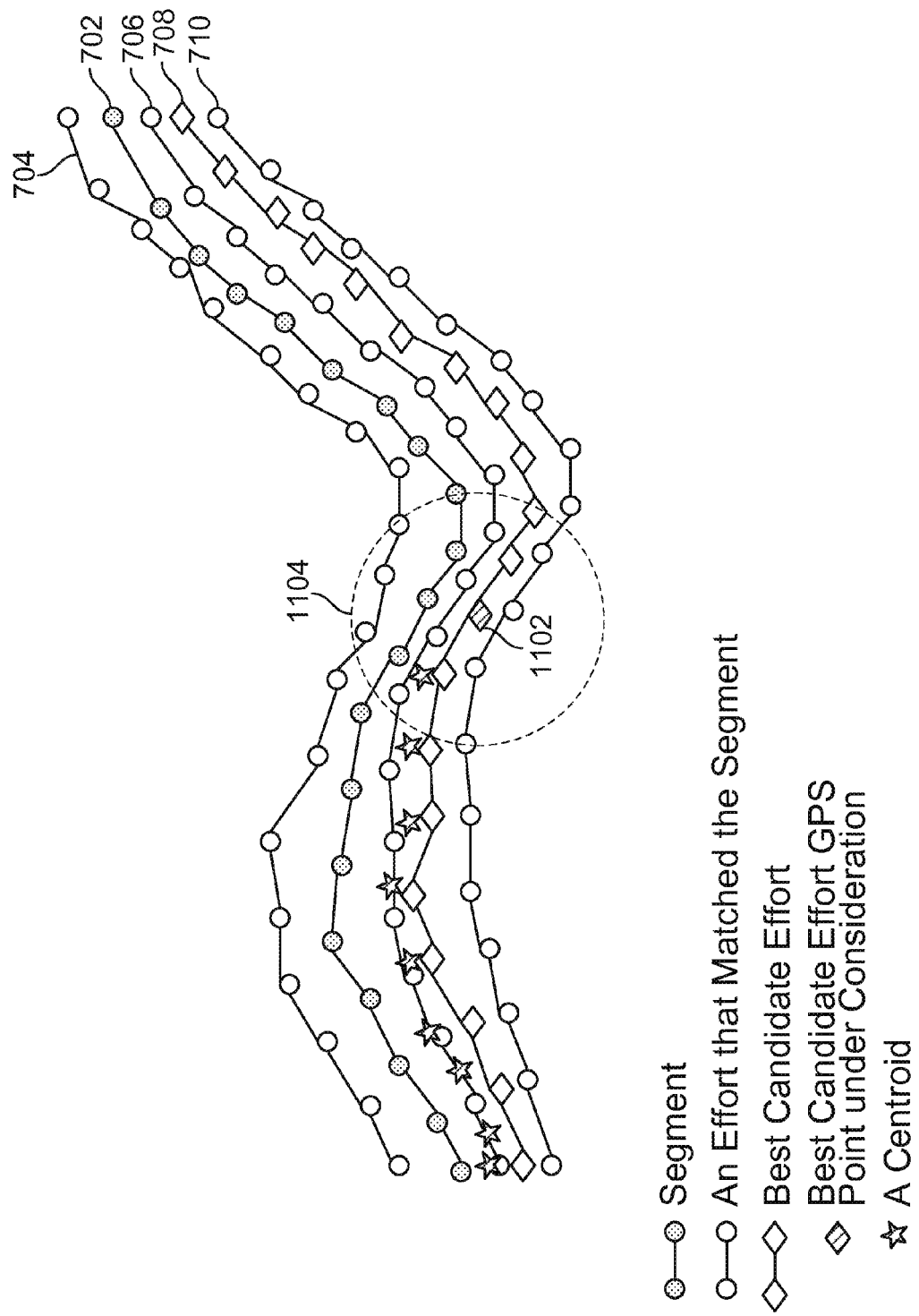
FIG. 11 is a diagram showing various centroids determined based on corresponding GPS data points of the best candidate effort.

FIG. 11 is a diagram showing various centroids determined based on corresponding GPS data points of the best candidate effort. Continuing the example of FIG. 10, in FIG. 11, subsequent GPS data points in the best candidate effort are walked along and used to determine a corresponding centroid. In the example, a centroid corresponding to GPS data point 1102 of the best candidate effort is currently being determined using at least circular area 1104.

Figure 12:
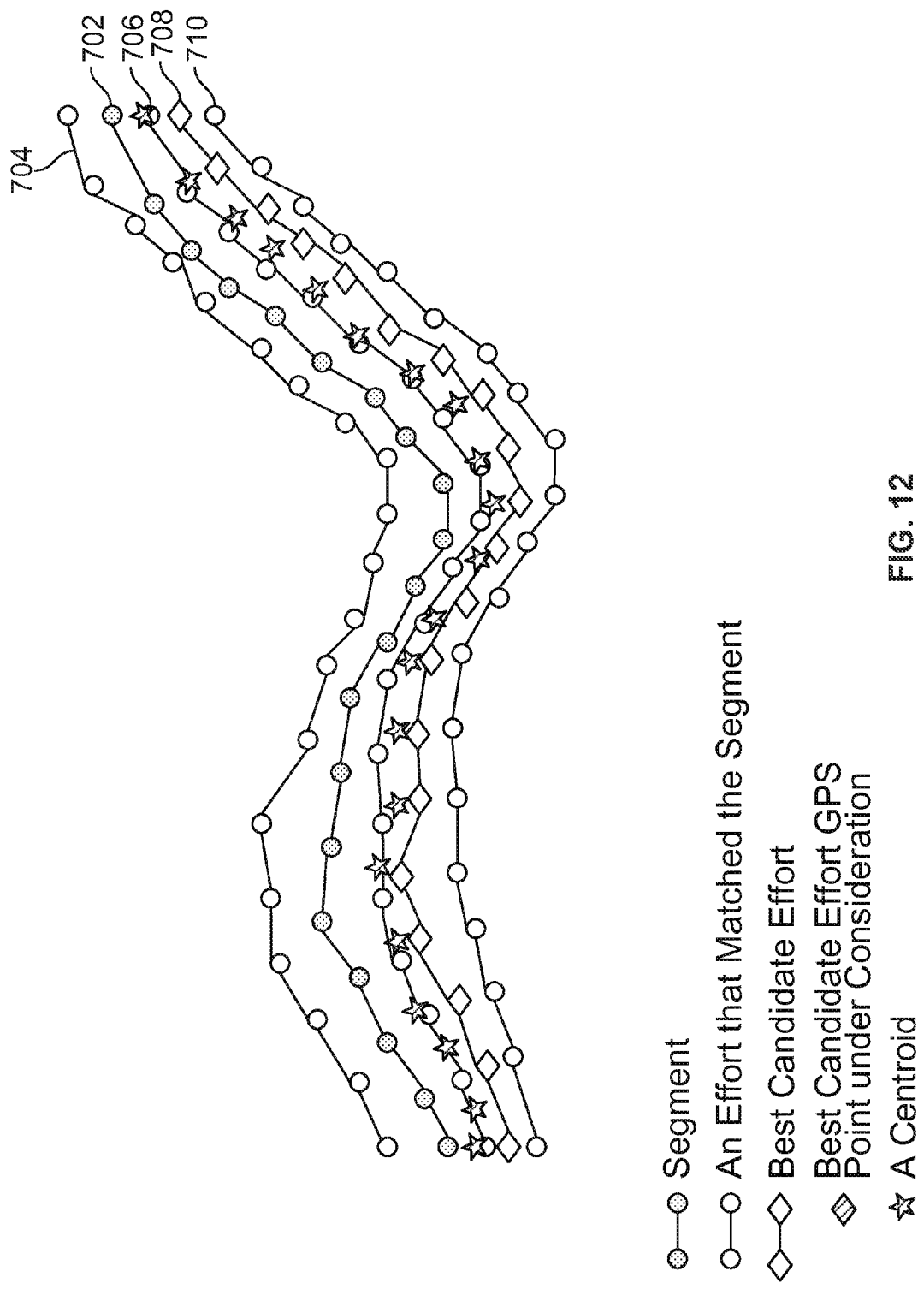
FIG. 12 is a diagram showing determined centroids corresponding to all the GPS data points of the best candidate effort.

FIG. 12 is a diagram showing determined centroids corresponding to all the GPS data points of the best candidate effort. Continuing the example of FIG. 11, FIG. 12 shows corresponding centroids having been determined for each GPS data point of the best candidate effort. In some embodiments, in determining the centroid associated with the last GPS data point of the best candidate effort, only the last GPS data point of each of the other matching efforts are considered so that the centroid will fall along the same end plane as the original segment, segment 702.

Figure 13:
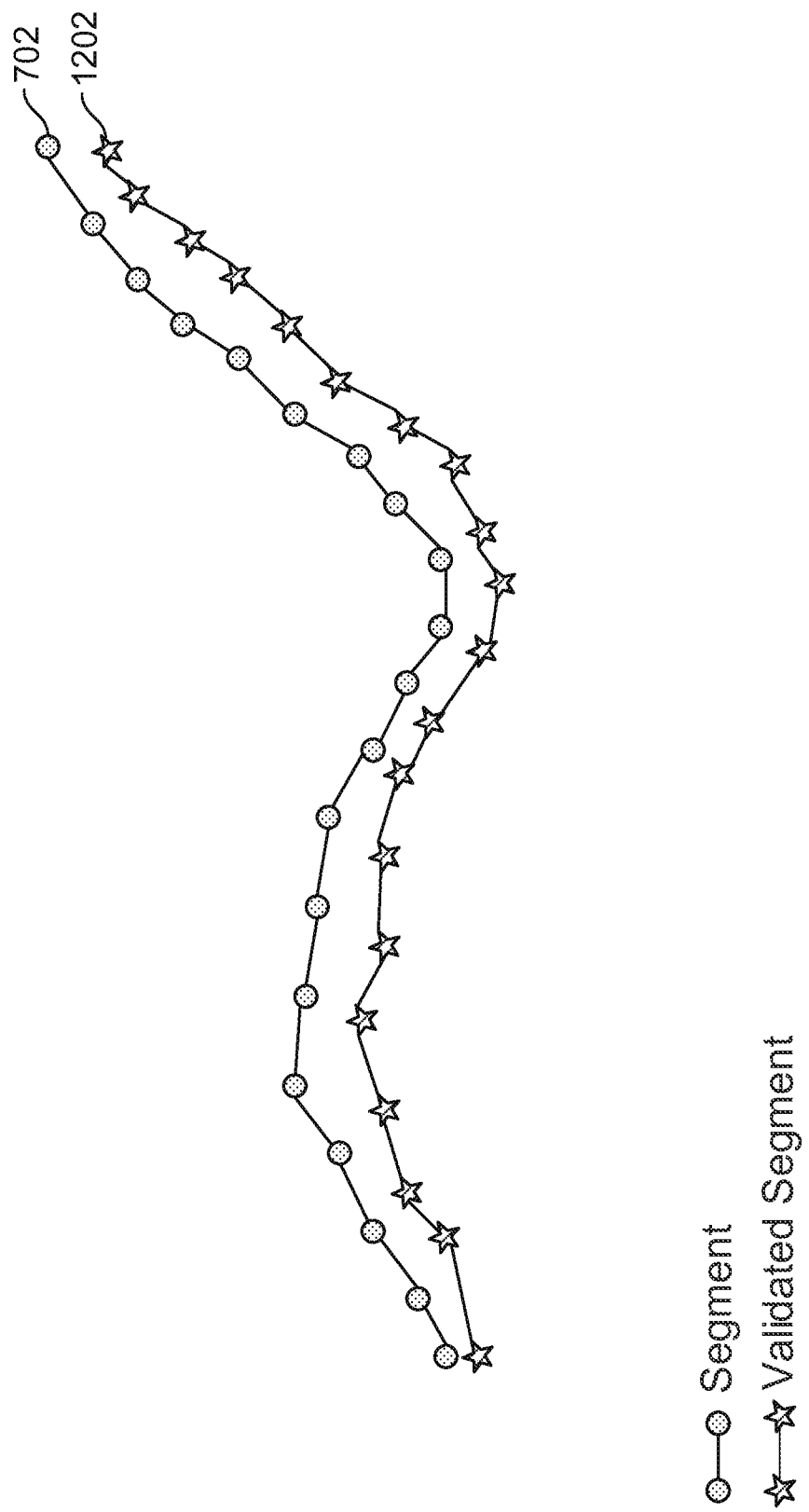
FIG. 13 is a diagram showing a validated segment determined based on the determined centroids.

FIG. 13 is a diagram showing a validated segment determined based on the determined centroids. Continuing the example of FIG. 12, FIG. 13 shows all the determined centroids corresponding to each GPS data point of the best candidate effort. Such centroids can be stored to represent the validated segment, segment 1202, which is the new version of the segment that was validated, segment 702. In some embodiments, segment 1202 may be stored with at least some of the metadata that was previously associated with segment 1202 (e.g., the identifier of "Montalvo hill climb") such that segment 1202 can replace segment 702. Existing and new efforts can be compared to segment 1202 to determine matching efforts.

Another example of generating a validated segment, which is not shown, includes finding an average of all the GPS data points included in each circular area centered on each GPS data point of the best candidate effort. Yet another example of generating a validating segment, which is not shown, includes inputting the GPS data associated with the segment to be validated and the matching efforts in a GIS program. The GPS data can be converted into a raster image. Different colors may be applied to areas of the raster image with different densities. For example, the areas with the highest densities may be colored in white. The white portions of the raster image may be connected to form the validated segment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   determine that a stored segment meets a validation criterion;
   obtain aggregated GPS data associated with a plurality of efforts that has been determined to match the stored segment, wherein the aggregated GPS data is received from a plurality of GPS-enabled devices;
   select an effort from the plurality of efforts;
   generate a set of new GPS points corresponding to at least a subset of a set of GPS points associated with the effort including by determining a new GPS point that is computed using the aggregated GPS data associated with the plurality of efforts based on a GPS point of the at least the subset of the set of GPS points associated with the effort, wherein the new GPS point comprises a centroid or an average; and
   generate a new version of the stored segment based at least in part on the set of new GPS points, wherein the new version of the stored segment is determined based at least in part on the centroid; and
   one or more memories coupled to the one or more processors and configured to store the new version of the stored segment.

2. The system of claim 1, wherein the validation criterion comprises one or more of the following: a predetermined period of time has passed since the stored segment has been created or last validated, a predetermined number of efforts has been determined to match the stored segment, less than a predetermined threshold of efforts has been determined to match the stored segment since the segment has been created or last validated, and receipt of an indication of a user selection to initiate a validation process.

3. The system of claim 1, wherein the plurality of efforts that has been determined to match the stored segment is each recorded with a selected GPS-enabled device.

4. The system of claim 1, wherein the new version of the stored segment is further determined based at least in part on the average.

5. The system of claim 1, wherein to select the effort from the plurality of efforts comprises to:
   determine for each GPS point of the set of GPS points associated with the effort a quantity of GPS points associated with the plurality of efforts within a predetermined radius from the GPS point;
   determine a sum based at least in part on quantities of GPS points corresponding to respective ones of the set of GPS points associated with the effort; and
   determine a score associated with the effort based at least in part on the sum, wherein the effort is selected based at least in part on the score.

6. The system of claim 1, wherein the plurality of efforts comprises a first plurality of efforts and wherein the one or more processors are further configured to determine a second plurality of efforts that matches the new version of the stored segment.

7. The system of claim 1, wherein determining the new GPS point comprises selecting a portion of the aggregated GPS data associated with the plurality of efforts that is within a predetermined distance from the GPS point associated with the effort.

8. The system of claim 7, wherein selecting the portion of the aggregated GPS data associated with the plurality of efforts that is within the predetermined distance from the GPS point associated with the effort comprises selecting GPS data associated with a subset of the plurality of efforts that are each recorded with a selected GPS-enabled device.

9. A method, comprising:
   determining that a stored segment meets a validation criterion;
   obtaining aggregated GPS data associated with a plurality of efforts that has been determined to match the stored segment, wherein the aggregated GPS data is received from a plurality of GPS-enabled devices;
   selecting an effort from the plurality of efforts;
   generating a set of new GPS points corresponding to at least a subset of a set of GPS points associated with the effort including by determining a new GPS point that is computed using the aggregated GPS data associated with the plurality of efforts based on a GPS point of the at least the subset of the set of GPS points associated with the effort, wherein the new GPS point comprises a centroid or an average; and
   generating a new version of the stored segment based at least in part on the set of new GPS points, wherein the new version of the stored segment is determined based at least in part on the centroid.

10. The method of claim 9, wherein the validation criterion comprises one or more of the following: a predetermined period of time has passed since the stored segment has been created or last validated, a predetermined number of efforts has been determined to match the stored segment, less than a predetermined threshold of efforts has been determined to match the stored segment since the segment has been created or last validated, and receipt of an indication of a user selection to initiate a validation process.

11. The method of claim 9, wherein the plurality of efforts that has been determined to match the stored segment is each recorded with a selected GPS-enabled device.

12. The method of claim 9, wherein the new version of the stored segment is further determined based at least in part on the average.

13. The method of claim 9, wherein selecting the effort from the plurality of efforts comprises:
   determining for each GPS point of the set of GPS points associated with the effort a quantity of GPS points associated with the plurality of efforts within a predetermined radius from the GPS point;
   determining a sum based at least in part on quantities of GPS points corresponding to respective ones of the set of GPS points associated with the effort; and
   determining a score associated with the effort based at least in part on the sum, wherein the effort is selected based at least in part on the score.

14. The method of claim 9, wherein the plurality of efforts comprises a first plurality of efforts and further comprising determining a second plurality of efforts that matches the new version of the stored segment.

15. The method of claim 9, wherein determining the new GPS point comprises selecting a portion of the aggregated GPS data associated with the plurality of efforts that is within a predetermined distance from the GPS point associated with the effort.

16. The method of claim 15, wherein selecting the portion of the aggregated GPS data associated with the plurality of efforts that is within the predetermined distance from the GPS point associated with the effort comprises selecting GPS data associated with a subset of the plurality of efforts that are each recorded with a selected GPS-enabled device.

17. A computer program product, the computer program product being embodied in a non-transitory computer readable storage medium and comprising computer instructions for:
  determining that a stored segment meets a validation criterion;
  obtaining aggregated GPS data associated with a plurality of efforts that has been determined to match the stored segment, wherein the aggregated GPS data is received from a plurality of GPS-enabled devices;
  selecting an effort from the plurality of efforts;
  generating a set of new GPS points corresponding to at least a subset of a set of GPS points associated with the effort including by determining a new GPS point that is computed using the aggregated GPS data associated with the plurality of efforts based on a GPS point of the at least the subset of the set of GPS points associated with the effort, wherein the new GPS point comprises a centroid or an average; and
  generating a new version of the stored segment based at least in part on the set of new GPS points, wherein the new version of the stored segment is determined based at least in part on the centroid.

18. The computer program product of claim 17, wherein determining the new GPS point comprises selecting a portion of the aggregated GPS data associated with the plurality of efforts that is within a predetermined distance from the GPS point associated with the effort.

19. The computer program product of claim 18, wherein selecting the portion of the aggregated GPS data associated with the plurality of efforts that is within the predetermined distance from the GPS point associated with the effort comprises selecting GPS data associated with a subset of the plurality of efforts that are each recorded with a selected GPS-enabled device.

* * * * *